United States Patent [19]
Giorgi et al.

[11] 3,713,898
[45] Jan. 30, 1973

[54] PROCESS FOR PREPARING HIGH-TRANSITION-TEMPERATURE SUPERCONDUCTORS IN THE NB-AL-GE SYSTEM

[75] Inventors: Angelo L. Giorgi; Eugene G. Szklarz, both of Los Alamos, N. Mex.

[73] Assignee: The United States of America as represented by the United States Atomic Energy Commission

[22] Filed: April 26, 1971

[21] Appl. No.: 137,498

[52] U.S. Cl. ......................148/126, 29/182, 75/200, 75/221, 335/216

[51] Int. Cl. ..............................................C21d 1/00

[58] Field of Search....75/208 R, 214, 200, 221, 213; 335/216; 148/126

[56] References Cited

UNITED STATES PATENTS

| | | | |
|---|---|---|---|
| 3,260,595 | 7/1966 | Maier | 75/214 X |
| 3,196,532 | 7/1965 | Swartz et al | 75/208 R X |
| 3,124,455 | 3/1964 | Buehler et al. | 75/214 |
| 3,028,341 | 4/1962 | Rosi et al | 75/200 |

OTHER PUBLICATIONS

Rothwarf et al., Physical Review, Vol. 152, pp. 341–344, December 2, 1966.
Willens et al., Solid State Communications, Vol. 7, pp. 837–841, 1969.
Blaugher et al., J.A.P. Vol. 40, No. 5, 4/1969
Jones, Fund. Prin. of Powder Mct. pxi, pp 819–821, Edward Arnold Ltd., London, 1960, TN 645 J6.

*Primary Examiner*—Benjamin R. Padgett
*Assistant Examiner*—R. E. Schafer
*Attorney*—Roland A. Anderson

[57] ABSTRACT

A process for preparing superconducting materials in the Nb-Al-Ge system having transition temperatures in excess of 19° K. which comprises premixing powdered constituents, pressing them into a plug, heating the plug to 1,450°–1,800° C. for 30 minutes to an hour under vacuum or an inert atmosphere, and annealing at moderate temperatures for reasonably long times (~ 50 hours). High-transition-temperature superconductors, including those in the $Nb_3(Al,Ge)$ system, prepared in accordance with this process exhibit little degradation in the superconducting transition temperature on being ground to −200 mesh powder.

17 Claims, 3 Drawing Figures

INVENTOR.
*Angelo L. Giorgi*
*Eugene G. Szklarz*
BY
Roland A. Anderson
Attorney

INVENTOR.
Angelo L. Giorgi
Eugene G. Szklarz
BY

PROCESS FOR PREPARING HIGH-TRANSITION-TEMPERATURE SUPERCONDUCTORS IN THE NB-AL-GE SYSTEM

CROSS-REFERENCE TO RELATES APPLICATION

"High-Transition-Temperature Superconductors in the Nb-Al-Ge System" Ser. No. 137,497, filed Apr. 26, 1971 by Angelo L. Giorgi and Eugene G. Szklarz filed concurrently with this application.

BACKGROUND OF THE INVENTION

The invention described herein was made in the course of, or under, a contract with the U.S. ATOMIC ENERGY COMMISSION. It relates to a process for preparing high-transition-temperature superconducting materials in the Nb-Al-Ge system, and more particularly to a process for preparing materials in this system that can be cold worked with a minimum of adverse effects on transition temperature.

Certain annealed materials in the Nb-Al-Ge system are the only materials presently known to have transition temperatures in excess of 19° K. In U.S. Pat. No. 3,506,940, issued Apr. 14, 1970, Corenzwit et al. disclose superconducting materials in the $Nb_3Al$-$Nb_3Ge$ system having transition temperatures of 19.5° K. and above. Arrhenius et al. in Proc. Nat'l. Acad. Sci. 61, 621–8 (1968) report that certain annealed niobium-rich members of the $Nb_3(Al,Ge)$ System have transition temperatures in excess of 20° K. They indicate that the $Nb_3(Al,Ge)$ system is a multiphase system consisting of the phases: body-centered cubic niobium with primarily aluminum and smaller amounts of germanium in solid solution; a low-temperature segregate, thought to be beta-tungsten phase, from the niobium solid solution; beta-tungsten phase, consisting of $Nb_3(Al,Ge)$; and frequently a small amount of sigma phase consisting of $Nb_2(Al,Ge)$. The high transition temperatures are attributed to the presence of the beta-tungsten phase. In the copending application, the present inventors disclose annealed materials in the $Nb_x(Al,Ge)$ system, where $x$ ranges from 1.9 to 3.0, consisting substantially of varying mixtures of the sigma and beta-tungsten phases ranging from substantially the tetragonal sigma phase ($D8_b$ type) to substantially the beta-tungsten phase have transition temperatures in excess of 19° K.

It is well known in the art that high-transition-temperature materials in the $Nb_3(Al,Ge)$ system may readily be formed by various melting techniques wherein powdered constituents—most often in the elemental form—are melted together to form the desired material. Corenzwit et al., for example, indicate that such materials may be prepared by arc melting, levitation melting, and splat melting. The literature discloses that arc melting is the technique most frequently used.

There are several significant problems associated with arc melting, or, for that matter, any melting, techniques used to produce high-transition-temperature materials in the Nb-Al-Ge system. For example, it is singularly difficult to prepare a single-phase material in the Nb-Al-Ge system by arc melting, which occurs at temperatures in excess of 2,000° C. The sigma phase forms peritectically between 1,800° and 1,900° C., and the rapid cooling inherent in an arc-melt material is thought to be responsible for the multiphase character of the resulting material.

Another problem associated with arc melting is the difficulty of maintaining constant compositions by this process. More volatile components tend to vaporize and leave the melt, thus producing a change in the composition of the material being prepared.

Finally, according to Corenzwit et al. in U.S. Pat. No. 3,506,940 there is generally no objection to cold working materials in the $Nb_3(Al,Ge)$ system subsequent to annealing, although such working is frequently prevented by the brittle nature of the materials. The application for U.S. Pat. No. 3,506,940 was filed May 2, 1967. It has since been found that cold working, as, e.g., grinding to fine powder, of annealed arc-melted materials in the $Nb_3(Al,Ge)$ system significantly degrades the transition temperatures of these materials. The degradation may be such that the new transition temperatures are well below those of the unannealed materials. In many potential applications of superconducting materials, cold working is desirable or even essential.

SUMMARY OF THE INVENTION

Superconducting materials in the Nb-Al-Ge system are readily prepared by premixing the powdered constituents, pressing them into a plug, heating the plug to 1,450°–1,800° C. for 30 minutes to an hour under vacuum or an inert atmosphere, and annealing at 700° to 800° C. for extended periods of time. These materials, which are multiphase in nature and range from substantially the tetragonal sigma phase ($D8_b$ type) to substantially the beta-tungsten phase, have transition temperatures in excess of 19° K.

In accordance with the process, the constituents are subjected to a heat treatment wherein the temperature is kept below the sigma phase peritectic so that no melting occurs but rather formation of the desired composition is accomplished by solid-state diffusion between the compacted constituents. Because no peritectic reaction occurs, it is possible to more closely control the phase distribution within the material. The lower temperatures at which the solid state reaction occurs substantially inhibit volatilization of any of the constituents so that the final composition is effectively determined by the ratio of powdered constituents that is initially mixed and compacted. In addition, materials consisting substantially of the beta-tungsten phase, i.e., those in the $Nb_3(Al,Ge)$ system, prepared according to this process exhibit almost no degradation in the superconducting transition on being ground to −220 mesh powder.

To ensure homogeneity in composition, the heat-treated plug may be ground into powder before annealing, the powder thoroughly mixed and repressed into a plug, the heat treatment repeated, and the anneal then commenced. However, materials in the Nb-Al-Ge system are readily prepared with transition temperatures in excess of 19° K. without undergoing these additional steps in the process.

DESCRIPTION OF THE PREFERRED EMBODIMENTS

Figure 1:
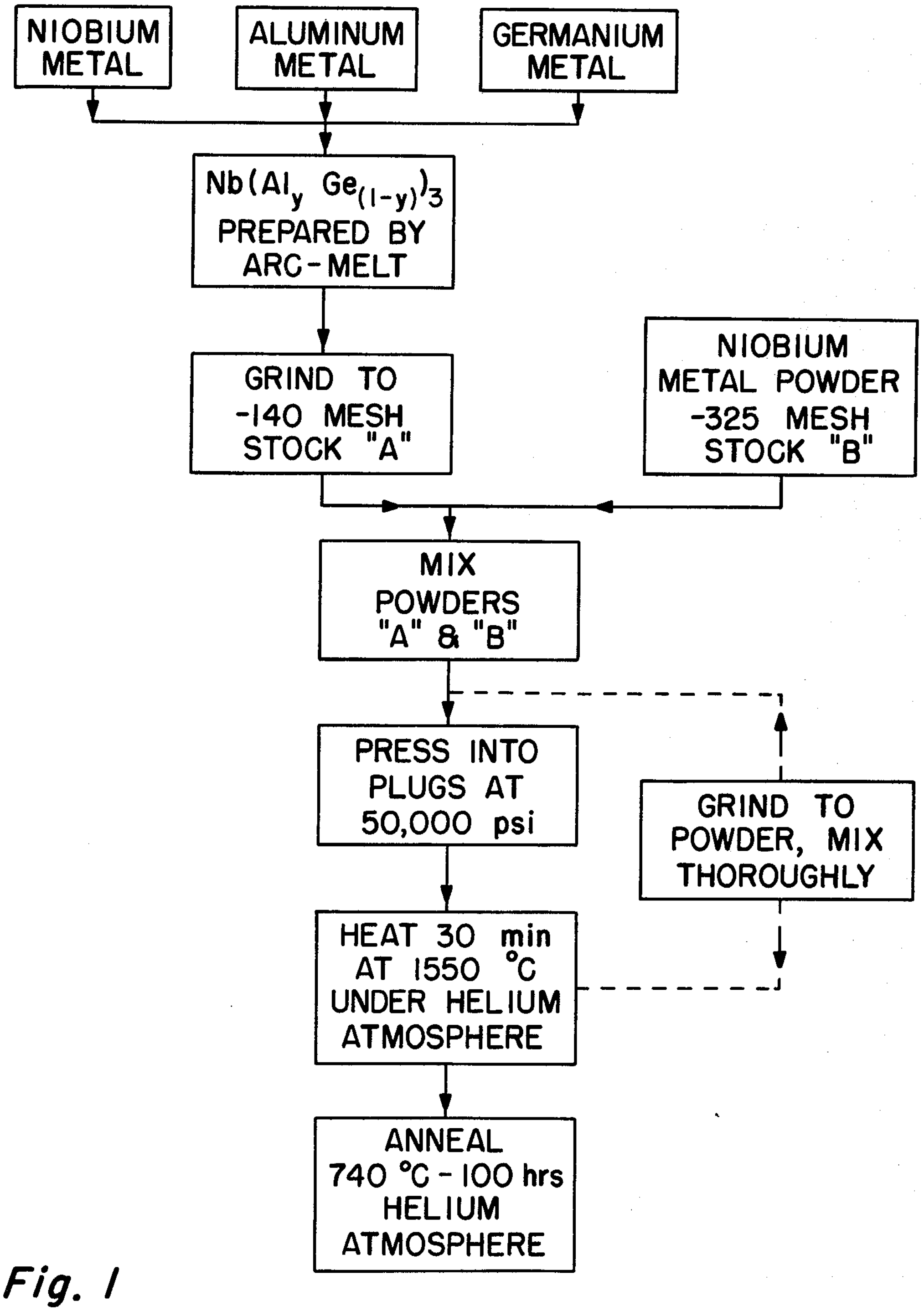
FIG. 1 is a flow chart showing a preferred embodiment of the invention.

Materials having the nominal composition $Nb_xAl_yGe_{(1-y)}$ and ranging from substantially the sigma phase to substantially the beta-tungsten phase are readily prepared according to the following process. A stock of material of nominal composition $Nb(Al_yGe_{(1-y)})_3$ having body-centered tetragonal ($NbAl_3$-type) structure is prepared by arc melting and then ground to a fine powder (−140 mesh). Any oxide impurity present in the aluminum starting material separates out as crystalline $Al_2O_3$ and is removed from the arc-melted button before it is ground. A desired composition $Nb_xAl_yGe_{(1-y)}$ is prepared by weighing proper amounts of powdered $Nb(Al_yGe_{(1-y)})_3$ and finely divided niobium metal, mixing the powders thoroughly, pressing in a steel die at approximately 50,000 psi and then heating in an eddy-current concentrator at 1,550° C. for 30 minutes under a helium atmosphere. Lattice parameters and transition temperatures after annealing for 11 representative compositions prepared by this method are given in the table. These materials were annealed at 740° C. for 100 hours and at 650° C. for an additional 60 hours. The superconducting transition temperatures for the various samples after preparation at 1,550° C. ranged between 18.4° and 18.6° K. The transition temperatures given in the table are for the compositions after the final anneal at 650° C. These values are identical to those measured after the first anneal at 740° C., but the superconducting transition is much sharper after the 650° C. anneal, i.e., the temperature span over which the transition occurs is much smaller.

Still another mode of preparation of these compositions consists of premixing the elemental powders, pressing into a plug,

TABLE

LATTICE PARAMETERS AND TRANSITION TEMPERATURES OF VARIOUS $Nb_x Al_{0.8} Ge_{0.2}$ COMPOSITIONS AFTER ANNEALING

| | | | Lattice Parameters | | |
|---|---|---|---|---|---|
| | | | Sigma Phase | | Beta-Tungsten |
| Sample | Nominal Composition | $T_c$ °K. | $a_0$ | $c_o$ | $a_o$ |
| 1 | $Nb_{2.0}Al_{0.8}Ge$ 0.2 | 19.8 | 9.931 ±1 | 5.173 ±1 | 5.174 ±2 |
| 2 | $Nb_{2.1}Al_{0.8}Ge_{0.2}$ | 19.7 | 9.931 ±1 | 5.173 ±1 | 5.173 ±1 |
| 3 | $Nb_{2.2}Al_{0.8}Ge_{0.2}$ | 19.5 | 9.930 ±1 | 5.172 ±1 | 5.174 ±1 |
| 4 | $Nb_{2.3}Al_{0.8}Ge_{0.2}$ | 19.5 | 9.929 ±1 | 5.173 ±1 | 5.174 ±1 |
| 5 | $Nb_{2.4}Al_{0.8}Ge_{0.2}$ | 19.7 | 9.929 ±1 | 5.170 ±2 | 5.174 ±1 |
| 6 | $Nb_{2.5}Al_{0.8}Ge_{0.2}$ | 19.4 | 9.931 ±1 | 5.169 ±2 | 5.176 ±1 |
| 7 | $Nb_{2.6}Al_{0.8}Ge_{0.2}$ | 19.8 | | * | 5.1725 ±2 |
| 8 | $Nb_{2.7}Al_{0.8}Ge_{0.2}$ | 19.6 | | * | 5.1743 ±1 |
| 9 | $Nb_{2.8}Al_{0.8}Ge_{0.2}$ | 19.5 | | * | 5.1757 ±2 |
| 10 | $Nb_{2.9}Al_{0.8}Ge_{0.2}$ | 19.5 | | * | 5.1765 ±2 |
| 11 | $Nb_{3.0}Al_{0.8}Ge_{0.2}$ | 19.4 | | * | 5.1767 ±1 |

*Concentration of sigma phase too low to permit lattice parameter determination.

heating the plug to 1,450° to 1,800° C. for 1 hour, cooling, and then annealing. A problem in using powdered elemental aluminum, however, is the inherent difficulty in avoiding oxygen contamination of the compositions being prepared.

Whenever these compositions are prepared by heat treating cold-pressed powdered constituents, it may be desirable to repeat the process one or more times to ensure a perfect homogeneity of composition throughout the final material. That is, after cooling, the plug is ground to powder again, the powder thoroughly mixed and repressed into a plug and again heat treated as before. When the plug is determined to be of suitable homogeneity the annealing schedule may be commenced by lowering the temperature to within the 700°–800° C. range and holding preferably for at least 50 hours and more optimally for approximately 100 hours. Alternatively, the material may be cooled to room temperature and the annealing schedule commenced at some later time by heating to 700°–800° C. for an appropriate length of time.

Critical limitations on the temperature range and time at temperature for the heat treatment of the pressed plug of powdered constituents have not been established. As indicated by the data of the table a heat treatment schedule of 30 minutes at 1,550° C. is sufficient to form the desired compositions. This temperature is not a critical one, however, and a material having the composition $Nb_{1.95}Al_{0.81}Ge_{0.19}$ has been prepared from pressed elemental powders by heating the pressed plug for 1 hour at 1,450° C. This material has a transition temperature of 18.3° K. before annealing and 19.6° K. after annealing for 100 hours at 750° C. It is evident, however, that 1,450° C. is not the lowest temperature at which the heat treatment is effective to form the desired compositions. The upper temperature useful for this heat treatment is thought to be about 1,800° C. because the sigma phase forms peritectically between 1,800° and 1.900° C. The pressure used to form the plug of compacted powders is not critical except insofar as it serves to bring the powders into intimate contact.

It can readily be seen from the table that the lattice parameters of the sigma phase and beta-tungsten phase of the compositions disclosed therein remain fairly constant over the entire series, with the concentration of the beta-tungsten phase increasing as the niobium concentration is increased. This is reasonably to be expected. However, when the compositions are ground to −200 mesh powders and superconducting measurements made on the powdered materials a totally unexpected result is obtained. None of the compositions show the strong degradation in the superconducting transition versus temperature curve normally observed for the arc-melt preparation of materials consisting substantially of the beta-tungsten phase. Yet on the basis of the prior art it would reasonably have been expected that samples 9, 10, and 11 of the table consisting substantially of the beta-tungsten phase, should show degradation in the superconducting transition similar to that given in FIG. 2 for an arc-melted material of composition $Nb_3Al_{0.8}Ge_{0.2}$. All the compositions given in the table showed very little degradation when powdered with the bulk of the material remaining superconducting over the entire temperature range measured, that is, 4.0° K. to the transition temperature.

Figure 2:
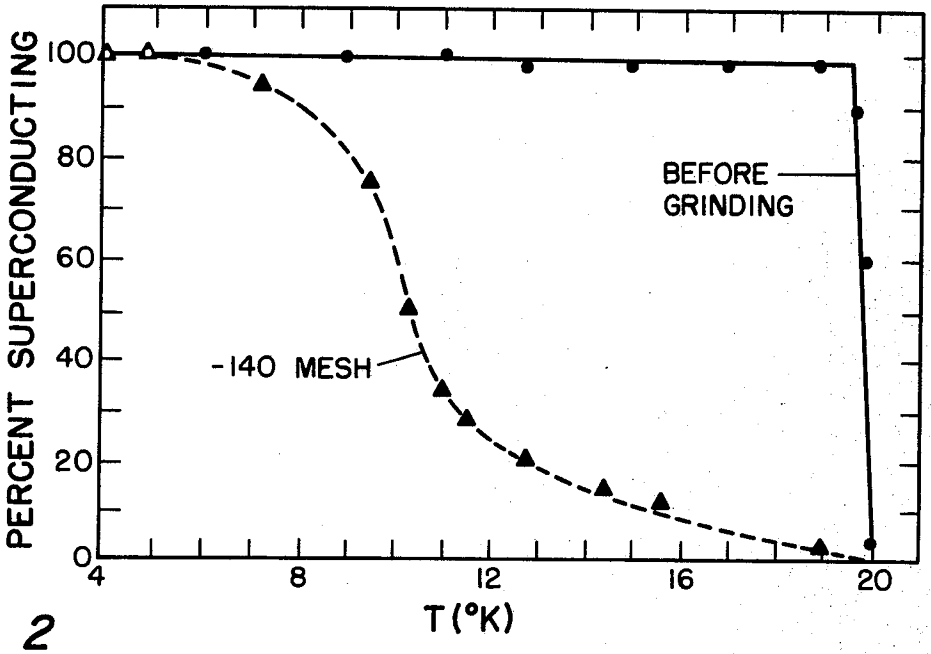
FIG. 2 shows the degradation in transition temperature for an annealed arc-melted sample ($Nb_3Al_{0.8}Ge_{0.2}$) consisting substantially of the beta-tungsten phase ground to a fine powder.
Figure 3:
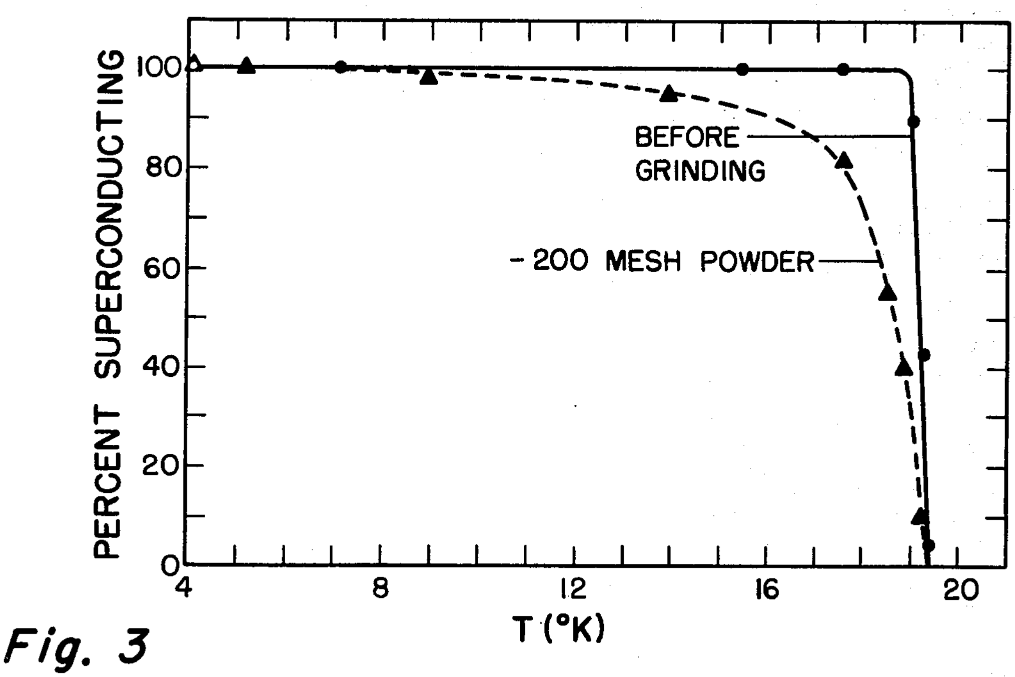
FIG. 3 shows the degradation in transition temperature for an annealed material ($Nb_3Al_{0.8}Ge_{0.2}$) prepared according to the process of FIG. 1 consisting substantially of the beta-tungsten phase ground to a fine powder.

As noted above, a significant problem with the beta-tungsten-phase $Nb_3(Al,Ge)$ system is that cold working of the annealed arc-melted compositions strongly degrades their transition temperatures. An example of the effect of grinding an annealed arc-melted material of nominal composition $Nb_3Al_{0.8}Ge_{0.2}$ to −140 mesh powder is shown in FIG. 2. Before the grinding almost 100 percent of the material becomes superconducting at a transition temperature of 19.5° K. After grinding to −140 mesh only about 50 percent of the material is superconducting at a temperature of 10.3° K. By comparison, as illustrated in FIG. 3, grinding to −200 mesh produces a much lesser degradation in the transition temperature of an annealed material of nominal composition $Nb_3Al_{0.8}Ge_{0.2}$ produced according to the process of FIG. 1 (sample 11 of the table). This represents a significant difference in beta-tungsten-phase $Nb_3(Al,Ge)$ prepared by arc melting and that prepared according to the process of FIG. 1.

X-ray diffraction analyses reveal that it is exceedingly difficult to prepare an arc-melted single-phase material consisting solely of the beta-tungsten phase or the sigma phase. Through choice of a proper ratio of elemental constituents one phase or the other can be made to predominate, but the second one remains present to some degree. Annealing may serve to reduce the amount of the undesired phase but it normally does not remove it completely. Thus, for example, Arrhenius et al. in attempting to maximize the amount of beta-tungsten phase present in a material having the nominal composition $Nb_{12}Al_3Ge$ report that even after an anneal at 850°–750° C. for 214 hours, vestigial amounts of the sigma phase, i.e., $Nb_2(Al,Ge)$, are still present. This is also the case with the niobium-deficient, i.e., the $Nb_2(Al,Ge)$, materials. Arc-melted samples of these materials even after long anneals, tend to contain small amounts of the beta-tungsten phase, i.e., $Nb_3(Al,Ge)$. This, of course, complicates attempts to ascertain what phase is responsible for the high transition temperatures found to be exhibited by certain materials in the $Nb_2(Al,Ge)$ system.

Although it is well known in the art that annealing is necessary for the achievement of high transition temperatures, the role that it plays is not completely understood. It appears that annealing serves to increase the ordering in the system, and it may also serve to minimize the amount of undesired phases present, as mentioned above. The annealing schedule will vary according to the system; but those materials heretofore known to display the highest transition temperatures, that is, those in the beta-tungsten $Nb_3(Al,Ge)$ system, have generally required long annealing at moderate temperatures to achieve the maximum transition temperatures. Annealing schedules which will maximize the transition temperatures of materials in the $Nb_x(Al,Ge)$ system, where $x$ ranges from 1.9 to 3.0 have not been determined; however, generally speaking the annealing schedule preferred for these materials is at least 50 hours at about 750° C. Shorter annealing times will increase the transition temperatures somewhat over those of the unannealed materials but not as substantially as the longer annealing times. Anneals for times in excess of 100 hours are known, however, to produce the greatest increases in transition temperature.

Critical temperatures for the various compositions were determined in the following manner. A stable 17-cycle alternating current is applied to the primary of a sensing coil. The output from two multithousand turn secondary coils (connected in opposition) is fed to the input of a Lock-In type of amplifier. The output from the amplifier is applied to the y-axis of an x-y recorder. The sample is placed within and affects only one of the secondary coils. Any slight change in the magnetic permeability of the sample causes an imbalance in the secondary circuit and results in a direct current signal at the output of the amplifier. The signal is proportional to the permeability change and thus gives a semi-quantitative value of it. Temperature is plotted along the x-axis of the recorder as a varying d.c. signal corresponding to changes in the resistance of a calibrated temperature sensing resistor in a liquid helium cryostat. (A motor driven voltage divider provides a continuously varying power input to the heater in the cryostat, resulting in a smooth temperature rise of the sample from 4° K. to approximately 25° K. over a 4-minute interval.) This results in a magnetic susceptibility versus temperature plot for the sample and detects all superconducting phases present in the temperature range under study. Simple switching permits more precise measurement of the transition temperatures through the use of a Wheatstone bridge.

Transition temperatures of all compositions were also measured by this technique in liquid hydrogen, with the temperature of the sample being varied by changing the vapor pressure above the liquid hydrogen. Transition temperatures determined with liquid hydrogen cooling were in excellent agreement with those measured using the calibrated temperature sensing resistor.

It will be apparent that the processes disclosed herein are not limited to the preparation of the compositions given by example herein but are applicable generally to the formation of any composition within the Nb-Al-Ge system consisting substantially of the tetragonal sigma phase or substantially of the beta-tungsten phase or substantially of mixtures of these phases and hence capable of having a transition temperature in excess of 19° K. In particular, it will be readily apparent on the basis of the disclosures of U.S. Pat. No. 3,506,940 and the copending application that the processes are applicable to the formation of high-transition-temperature superconductors of the general formula $Nb_xAl_yGe_{(1-y)}$ where $x$ ranges from 1.9 to 3.0 and y ranges from 0.4 to 0.9. Further, the disclosure of Arrhenius et al. in Proc. Nat'l. Acad. Sci. 61, 621–8 (1968) clearly indicates that the process will be applicable to the formation of high-transition-temperature superconductors comprising niobium-rich members of the $Nb_3(Al,Ge)$ system. Generally speaking, the processes disclosed herein may be used to form any high-transition-temperature superconductor in the Nb-Al-Ge system that can also be formed by arc melting.

What we claim is:

1. A method of preparing a high-transition-temperature superconducting material of the general composition $Nb_xAl_yGe_{(1-y)}$ where $x$ ranges from 1.9 to 3.0 and y ranges from 0.4 to 0.9 which comprises (a) mixing powdered constituents in the desired ratio, (b) pressing the mixture to a plug, and (c) heating to 1,450°–1,800° C. for at least 30 minutes.

2. The method of claim 1 wherein the powdered constituents are elemental powders.

3. The method of claim 1 wherein the powdered constituents are elemental niobium and arc-melted $Nb(Al_yGe_{(1-y)})_3$ where $y$ is in the range of 0.5 to 0.9.

4. The method of claim 3 wherein the plug is heated to 1,550° C. for 30 minutes.

5. The method of claim 1 wherein the heat-treated plug is ground to fine powder, the powder thoroughly mixed and again pressed into a plug, and the heat treatment repeated.

6. The method of claim 1 wherein the plug is then annealed at 700°–800° C.

7. The method of claim 6 wherein the anneal is at 740° C. for 100 hours.

8. A method of preparing a high-transition-temperature superconducting material in the $Nb_3(Al,Ge)$ system consisting substantially of the beta-tungsten phase and which exhibits minimal degradation on being ground to -200 mesh powder which comprises (a) mixing powdered constituents in the desired ratio, (b) pressing into a plug, and (c) heating to 1,450°–1,800° C. for at least 30 minutes.

9. The method of claim 8 wherein the powdered constituents are elemental niobium and arc-melted $Nb(Al_yGe_{(1-y)})_3$ where $y$ is in the range of 0.5 to 0.9.

10. The method of claim 9 wherein the plug is heated to 1,550° C. for 30 minutes.

11. The method of claim 8 wherein the plug is annealed at 700°–800° C.

12. The method of claim 11 wherein the anneal is at 740° C. for 100 hours.

13. A method of producing superconducting materials in the Nb-Al-Ge system having transition temperatures of at least 19° K. selected from multiphase mixtures of the class consisting of (1) substantially the tetragonal sigma phase, (2) substantially of the beta-tungsten phase, and (3) substantially of mixtures of the tetragonal sigma and beta-tungsten phases which comprises (a) mixing powdered constituents in the desired ratio, (b) pressing into a plug, and (c) heating to 1,450°–1,800° C. for at least 30 minutes.

14. The method of claim 13 wherein the powdered constituents are elemental niobium and arc-melted $Nb(Al_yGe_{(1-y)})_3$ where $y$ is in the range of 0.5 to 0.9.

15 The method of claim 14 wherein the plug is heated to 1,550° C. for 30 minutes.

16. The method of claim 13 wherein the plug is annealed at 700°–800° C.

17. The method of claim 16 wherein the anneal is at 740° C. for 100 hours.

* * * * *